Dec. 8, 1959 — H. E. VAN VOORHEES — 2,916,318
AUTOMOBILE DOOR LATCH
Filed Aug. 22, 1957 — 2 Sheets-Sheet 1

INVENTOR.
Harold E. Van Voorhees
BY
W. Pettigrew
ATTORNEY

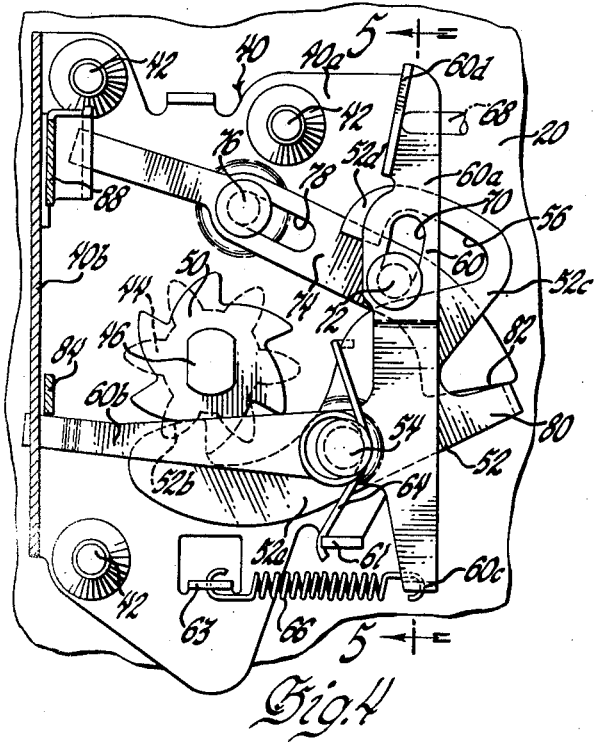

United States Patent Office 2,916,318
Patented Dec. 8, 1959

2,916,318

AUTOMOBILE DOOR LATCH

Harold E. Van Voorhees, Grosse Pointe, Mich., assignor to General Motors Corporation, Detroit, Mich., a corporation of Delaware Application August 22, 1957, Serial No. 679,670

4 Claims. (Cl. 292—280)

This invention relates to a door latch for a vehicle, and more particularly to an improved locking arrangement in a door latch for the rear door of a four-door automobile.

In a four-door automobile, at least one and usually both of the front door latches conventionally are provided with outside key operated locking means and also with inside locking means, as for example, a garnish molding push button. When the door is locked the latch is rendered ineffective against outside operation either by blocking some of the latching parts, or, as is preferable, by uncoupling certain latch operating parts from the detent which holds the bolt against release movement so that the outside push button or handle operator merely free wheels upon operation without releasing the latch. In automobile front doors, it is usually considered preferable to provide for so-called "remote undogging" so that upon operation of the inside remote handle the latch is released.

In conventional automobile construction, the rear door latches are not provided with any outside key lock, but are provided only with an inside garnish molding type lock actuator which again may operate either by blocking some of the latch parts, or, as usually is considered preferable, by uncoupling the latch operating parts from the detent. Again the locking operation renders the outside push button or other operator ineffective, preferably causing this operator merely to free wheel without operating the latch parts. Many present day automobiles are provided with a selective control device on the latch which may be set so that the door may be opened by the inside remote handle even though locked against outside actuation or which selectively may be set so that the inside handle merely free wheels upon operation without releasing the latch.

It has been found that in the great majority of cases this selective mechanism is set and left so that the inside remote handle is uncoupled or rendered ineffective when the door is locked in the same manner as the rear door outside actuator. Consequently, the additional mechanism necessary to provide the selective operation is very seldom used.

This invention provides an improved door latch particularly adapted for the rear door of an automobile in which an improved and simple means is provided for rendering the inside remote handle ineffective in the same manner as the outside actuator when the door is locked. The latch includes fewer parts than are found in conventional door latches of this type and is relatively cheap to manufacture with no impairment of effectiveness or efficiency.

Instead of providing a plurality of overlapping parts to achieve the desired function, free wheeling operation of the remote inside handle is achieved by forming the operating lever which is engageable by the outside push button operator with an integral arm operated by a remote lever on the latch frame so that both the inside and outside operators act through the same operating lever. Consequently, when this operating lever is uncoupled from the detent, both the inside and outside operators are rendered ineffective.

Other features and advantages of the invention will be apparent from the following description and from the drawings in which:

Fig. 4 is a view similar to Fig. 2 but showing the parts in locked position;

Fig. 5 is a vertical section along the line 5—5 of Fig. 4;

Fig. 6 is a side elevation of a modified form of latch embodying the invention; and Fig. 7 is a section taken along the line 7—7 of Fig. 6.

Referring now more particularly to the drawings, an automobile designated generally as 10 has a front door 12 which is hingedly mounted on the automobile body in conventional manner (not shown) along its front edge and which is latched in conventional manner to a center pillar 14. An outside gripping handle 16 is mounted on the door and is provided with a push button operator 18 for releasing the latch. A suitable push button and its associated push rod structure are shown in Patent 2,796,276 issued to James D. Leslie on June 18, 1957.

Figure 1:
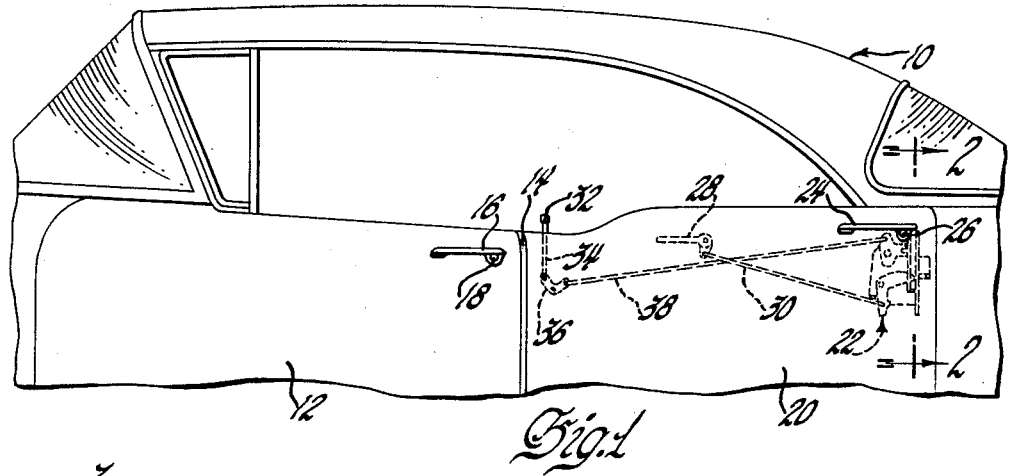
Fig. 1 is a fragmentary side elevational view of an automobile incorporating the improved latch in the rear door.

The rear door 20 of the automobile is hinged in conventional manner (not shown) to the center pillar 14 and is latched at its rear free swinging edge to the automobile body as shown in Leslie Patent 2,796,276. The latch is designated generally as 22 in Fig. 1. An outside gripping handle 24 is fixedly mounted on the automobile door and carries a slidable outside operating push button 26. For releasing the latch from the inside of the automobile, there is a turn handle 28 mounted on the inner door panel at a location remote from the latch and connected to the latch by a rod 30. A conventional garnish molding push button 32 is mounted on the door for locking the door from the inside. This push button is connected to the latch through a rod 34 connected to one arm of a bell crank 36 pivotally mounted in the door, the other arm of the bell crank being connected to the latch by a rod 38.

The latch parts are mounted on a latch frame designated generally as 40 and having a body portion 40a lying parallel to the jamb face of the door and a flange portion 40b lying parallel to the inner door panel. The body portion of the frame is secured to the jamb face of the door by bolts 42.

A gear type bolt 44 is mounted on the outer surface of the frame body 40a being fixed rigidly on a stud 46 which is journalled for rotation in the frame. The stud 46 is rotatably supported at its outer end in the outer face of a bolt housing 48 which is welded to the frame or secured thereto in any other manner as is well known in the art.

On the inside surface of the frame body 40a and rigidly mounted on the stud 46 for rotation with the bolt 44 is a ratchet 50. While the ratchet may be provided with any number of teeth desired, in the arrangement shown the ratchet and the bolt, which are effectively an integral unit, each is provided with six teeth. The bolt cooperates with the teeth of a conventional striker mounted on the automobile body as is shown in Leslie Pateht 2,796,276. When the door is latched the bolt is held against rotation in a clockwise direction as the parts appear in Figure 2 so that the door cannot be pulled open without releasing the bolt and ratchet for free rotation.

A detent 52 is pivotally mounted on a stud 54 on the latch frame body 40a. The detent has one arm 52a terminating in a foot 52b for engagement with a tooth of the ratchet 50 to hold the ratchet against clockwise rotation. On the side of the pivot stud 54 remote from the foot 52b the detent has an integral second arm 52c formed with a hooked end portion 52d defining a generally triangularly shaped recess 56.

An operating lever 60 is pivoted on the stud 54 coaxially with and overlying the detent 52. The operating lever is formed as a bell crank and has an upwardly extending leg 60a and a second generally horizontally extending leg 60b which projects generally at a right angle to the leg 60a and which terminates in a free end projecting through an elongated guide slot 62 in the flange 40b of the frame. A hairpin spring 64 on the stud 54 has one end connected to a tab 61 on the latch frame and the other end hooked over the arm 52c of the detent to yieldably urge the detent into engagement with the ratchet. A tension spring 66 is connected between a tab 63 on the latch frame and a downwardly extending ear 60c on the operating lever to urge the operating lever in a clockwise direction in Fig. 2.

At the upper end of the arm 60a of the operating lever, there is a turned flange 60d which is adapted to be engaged by a push rod 68 forming part of the outside operating push button mechanism 26.

The upstanding arm 60a of the operating lever is selectively releasably coupled to the detent 52 so that when the parts are in unlocked position and the operating lever is swung in a counterclockwise direction (Fig. 2), it will pick up the detent and swing the foot 52b of the detent out of engagement with the ratchet, permitting free rotation of the bolt and ratchet so that the door can be opened. When the parts are in locked position (Fig. 4), the operating lever merely free wheels without picking up the detent. The arm 60a of the operating lever is formed with an elongated curved slot 70 through which extends a headed pin 72 projecting from an intermittent link 74. This link underlies both the detent 52 and the operating lever 60 and is mounted on a stud 76 on the latch frame for swinging movement about the axis of the stud 76 and for slidable or longitudinally shifting movement along the length of a slot 78 in the link 74 through which the stud 76 projects.

When the parts are in the position shown in Figure 2, the latch is unlocked; that is to say, the operating lever 60 is coupled to the detent and when the operating lever is swung by means of the push rod 68 (or by an inside operator later to be described) the upstanding arm 60a of the lever will move in a counterclockwise direction (to the left in Figure 2) and the pin 72, which is located in the bight of the detent hook 52d, will be carried to the left with the operating arm because of its interconnection with the operating arm through the stud 76 and slot 78. As shown in the drawing, the detent lies in a plane between the intermittent link and the operating lever and the pin 72 engages the inner surface of the detent hook and swings the detent in a counterclockwise direction when the operating lever is moved. This releases the foot 52b of the detent from the ratchet 50.

Figure 4 shows the parts in locked position. Now the intermittent link has been swung clockwise so that the pin 72 has moved down in the slot 70 of the operating lever and also down in the recess 56 of the detent away from the bight of the detent hook portion 52d. When the parts are locked or uncoupled as shown, counterclockwise movement of the operating lever will cause the pin 72 merely to free wheel in the recess 56 below the end of the detent hook without picking up the detent and without releasing the latch. It should be noted that when the parts are in the locked position of Figure 4, an undogging shoulder 82 on the intermittent link is in close abutting relation with a cam portion 80 of the detent. Should the door be slammed shut, the ratchet 50 will move through an arc of rotation as the bolt rides over the keeper teeth, camming the detent in a counterclockwise direction and causing the cam portion 80 of the detent to cam the intermittent link counterclockwise around the pin 76 back to the unlocked position of Figure 2.

Inside operating means are provided on the flange 40b of the latch and this inside operating means is operable through the integral leg 60b of the operating lever so that the inside handle operates the latch in the same manner as the outside push button operator. In other words, when the door is locked, the inside handle free wheels and does not release the latch. As shown in Figure 3, there is a bell crank remote lever 84 pivotally mounted on a pin 86 on the flange 40b of the latch frame. One arm of this remote lever is connected by the rod 30 to the inside turn handle 28. The other arm overlies the free end of the leg 60b of the operating lever. Consequently, when the turn handle 28 is operated it will merely free wheel if the parts are in the latched position of Fig. 4 since the inside operating means is connected to latch release means through the operating lever 60 which is common to the outside operating means.

Figures 2, 3:
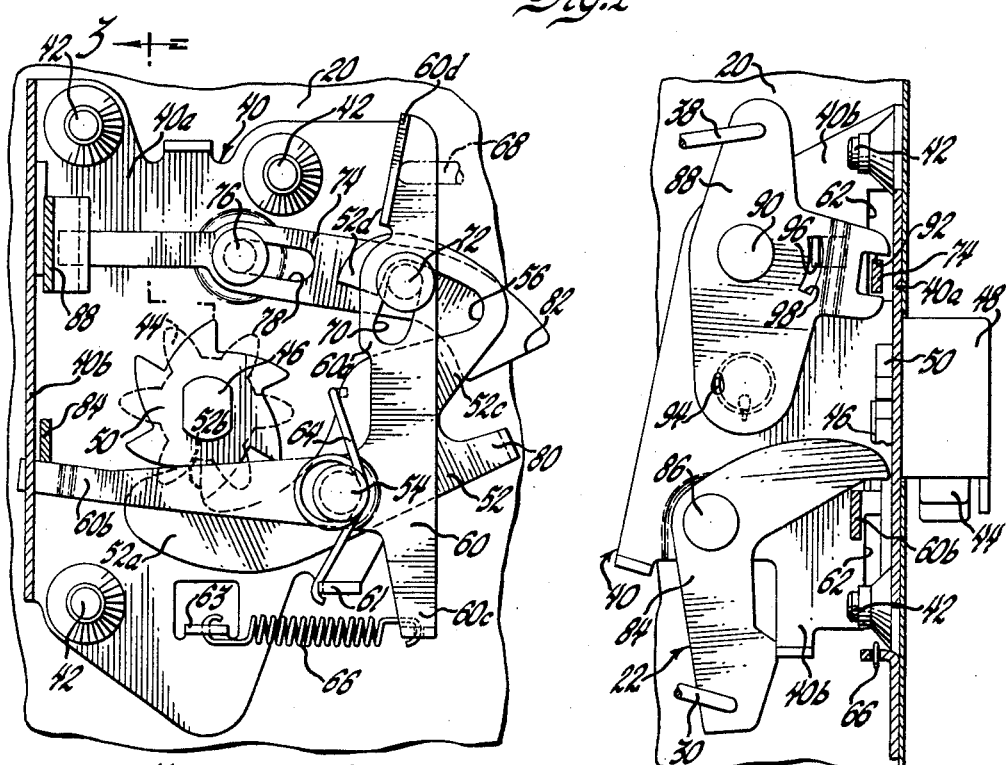
Fig. 2 is an enlarged section taken along the line 2—2 of Fig. 1 and showing the latch with the parts in unlocked position.
Fig. 3 is a vertical section through the latch taken along the line 3—3 of Fig. 2.

Figure 3 also shows a locking lever 88 pivoted on a pin 90 on the flange 40b of the latch frame. One arm of this locking lever is connected by the rod 38, bell crank lever 36 and rod 34 to the garnish molding button 32 so that when the button is depressed the lever will be swung in a counterclockwise direction. Another arm of the locking lever is formed with an open ended slot 92 which receives the free end of the intermittent link 74 so that the intermittent link may be swung between the unlocked position of Fig. 2 and the locked position of Fig. 4 by the locking lever through the garnish molding button. An overcenter spring 94 yieldably holds the lock lever (and consequently the intermittent lever) in either locked or unlocked position and a tab 96 bent from the latch frame projects through a slot 98 in the lock lever to limit the range of movement of this part.

The latch above described provides a simple and effective device for operating the latch through a member common to the inside and outside operators so that these operators are both locked at the same time. Using a common pivot 54 for the detent and for the operating lever, further simplifies the structure.

Figures 6 and 7 show a modified form of the invention. In the species described in connection with Figures 2, 3, 4 and 5, the outside operating push button 26 is located up adjacent the upper edge of the latch frame for direct engagement with the flange 60d of the operating lever. It may be that the automobile body contour is such that the push button is preferably located down adjacent the lower edge of the latch frame. The species of Figures 6 and 7 illustrates this arrangement utilizing the same latch as described in connection with Figures 2, 3, 4 and 5 with the addition of a single lever which is coupled to the operating lever. In Figures 6 and 7, the operating lever is designated as 100. While this lever is of the same general configuration as the operating lever 60 of Figure 2, it is cut away at the top above the slot which receives the pin 72 to eliminate the flange 60d. A secondary lever 102 is pivotally mounted on the latch frame on a pin 104 and overlies the operating lever. The secondary lever is formed with an elongated slot 105 through which extends a headed pin 106 rigidly mounted on the operating lever. Since this pin couples the secondary lever and the operating lever together at a location spaced from the pivotal mounting stud 54 for the operating lever, the secondary lever may be swung in a clockwise direction to pick up and swing the operating lever in a counterclockwise direction. At its lower free end, the secondary lever is formed with a right angle flange 108 which may be engaged directly by a push rod 68 associated with an outside push button operator.

In all other respects the embodiment of Figs. 6 and 7 is similar to the embodiment of Figs. 2–5.

While I have shown and described certain embodiments of my invention, it is capable of many modifications.

Changes, therefore, in the construction and arrangement may be made without departing from the spirit and scope of the invention as set forth in the appended claims.

I claim:

1. A vehicle door latch comprising, a frame having a body portion lying parallel to the jamb face of a door and a right angular flange portion formed with a slot; latching means mounted on said body portion, including a bolt rotatably mounted on one surface of the body portion and a ratchet mounted coaxial with the bolt on the opposite surface of the body portion and rotatable with said bolt; a detent pivotally mounted on said frame, said detent having a foot adapted to engage said ratchet to hold the ratchet and bolt against rotation in one direction and said detent having an arm terminating in an open hook; an operating lever pivotally mounted on the body portion of the frame coaxial with the detent, said lever being formed as a bell crank having a first leg extending in one direction from its pivot and an integral second leg extending generally at right angles to the first leg toward said flange and projecting through said slot, said first leg overlying the hook of the detent and being formed with an elongated slot in registry with the bight of the hook; locking means including a link slidably and swingably mounted on the body portion of the frame and a pin projecting from said link into movable engagement with said operating lever through said elongated slot, said pin lying at one end of the elongated slot in registry with the hook of the detent and coupling said link and operating lever to the detent through the hook thereof when the link is swung to one position, and said pin lying at the other end of the elongated slot in registry with the open bight of the hook of the detent and uncoupling said link and operating lever from the detent when the link is swung to another position, the link sliding when the operating lever is swung; outside latch release means adapted to engage the first leg of said operating lever to swing the operating lever; an inside latch release means including a lever pivoted on said flange and adapted to engage the second leg of said operating lever to swing the operating lever.

2. Apparatus of the character claimed in claim 1, wherein said outside operating means includes a push button assembly having direct engagement with said operating lever.

3. Apparatus of the character claimed in claim 1, wherein said outside operating means includes a push button assembly and a secondary lever, the push button assembly having direct engagement with the secondary lever and the secondary lever being pivotally mounted on the body portion of the frame overlying said operating lever and being permanently movably connected thereto by means of a pin on one lever projecting through an elongated slot in the other lever.

4. Apparatus of the character claimed in claim 3, wherein said operating lever has a pin projecting from the first leg thereof at a location spaced from the pivotal mounting thereof and wherein said secondary lever is formed with an elongated slot receiving said pin to couple the operating lever to the secondary lever.

References Cited in the file of this patent
UNITED STATES PATENTS

| | | |
|---|---|---|
| 2,629,618 | Roethel | Feb. 24, 1953 |
| 2,716,568 | Davies | Aug. 30, 1955 |
| 2,814,519 | Roethel | Nov. 26, 1957 |